Figure 1:
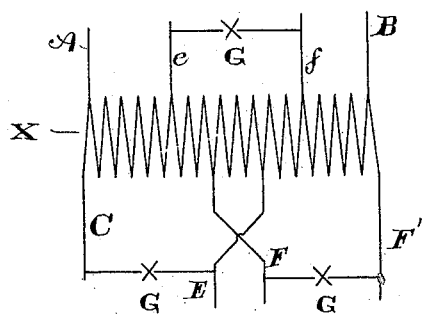

(No Model.) 2 Sheets—Sheet 1.

E. THOMSON.
SYSTEM OF ELECTRIC DISTRIBUTION.

No. 543,950. Patented Aug. 6, 1895.

WITNESSES.
Harry O. Westendarf
T. J. Johnston

INVENTOR.
Elihu Thomson,
by
Geo. R. Blodgett,
atty.

(No Model.) 2 Sheets—Sheet 2.

E. THOMSON.
SYSTEM OF ELECTRIC DISTRIBUTION.

No. 543,950. Patented Aug. 6, 1895.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

SYSTEM OF ELECTRIC DISTRIBUTION.

SPECIFICATION forming part of Letters Patent No. 543,950, dated August 6, 1895.

Application filed June 28, 1894. Serial No. 516,006. (No model.)

*To all whom it may concern:*

Be it known that I, ELIHU THOMSON, a citizen of the United States, residing at Swampscott, in the county of Essex, State of Massachusetts, have invented certain new and useful Improvements in Systems of Distribution of Electric Energy, of which the following is a specification.

My invention relates to systems of distribution of electric energy, and particularly to those adapted to be operated by alternating currents, and has for its object to provide a convenient method and means of subdividing and regulating the potential of currents of the class pointed out. More specifically it relates to the so-called "compensating devices" adapted to operate electric-arc lamps, incandescent lamps, or other translating devices with a fraction only of the potential delivered from the generator, such devices being commonly known in the art as "compensators;" and by the methods of winding such compensators or coils, as are hereinafter referred to, I obtain new results in economical conversion and distribution.

Briefly stated, my invention consists in so subdividing the potential delivered from any appropriate source of energy as to adapt it for the particular purpose for which the circuit is run; and this I am enabled to do, not only where the potential may be subdivided into aliquot parts, but also in cases where it is insufficient in amount to properly run two or more translating devices, I may raise it to such an amount as will be just sufficient, or in case it is too great, I can dispose of the remainder by generating an opposing electromotive force which acts to cut down the voltage delivered to the translating devices. This latter result I may obtain by winding the compensator in such a way as to obtain the required counter electromotive force by taking connections for the impressed circuits which overlap each other by an amount sufficient to generate the opposing voltage required; or I may, if preferred, simply make the coil of such length that a portion of it at either end may act as a counter electromotive-force coil and cut down the amount of voltage required.

More specifically still, my invention consists in inserting in the impressing-circuit, ordinarily taken from the secondary of the transformer, (although it may equally well be taken from a generator of proper electromotive force,) a compensating coil connected to such impressing-circuit at different distances from the ends of the coil, adapted to the potential desired between the coil terminals, and in connecting to this compensating coil the impressed circuit or circuits containing the translating devices by leads which do not embrace the entire length of the coil. For example, if I wish to have the potential generated in the coil the same in amount as that between the lines of the impressing-circuit, I connect this circuit to the ends of the coil and connect the impressed circuit to such points in the coil as will give the potential desired. If I wish, however, to get an increased electromotive force in the coil, I connect the impressing-circuit to points intermediate between its ends and its middle, the portion of the coil upon the outside of the lead acting to "boost" the potential, as it is commonly called, one of the leads of the impressed circuit in this case being connected to the end of the coil and the other to such intermediate point as may be proper for the potential desired; while to generate a less potential than that between the mains of the impressing-circuit I connect the impressing-circuit to the ends of the coils and connect the impressed circuit to two points intermediate of the length of the coil adapted to generate the potential desired in such circuit, all of which will be more fully explained in the accompanying specification, while the novelty will be pointed out in the claims.

Figure 4:
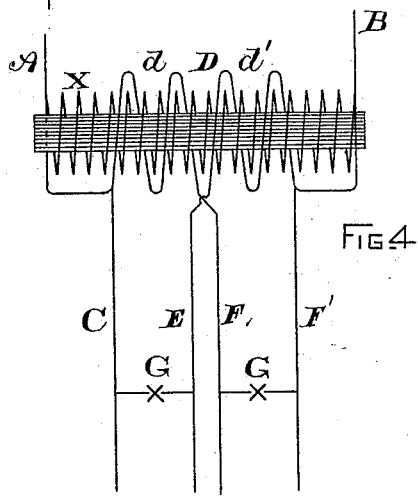
Figure 5:
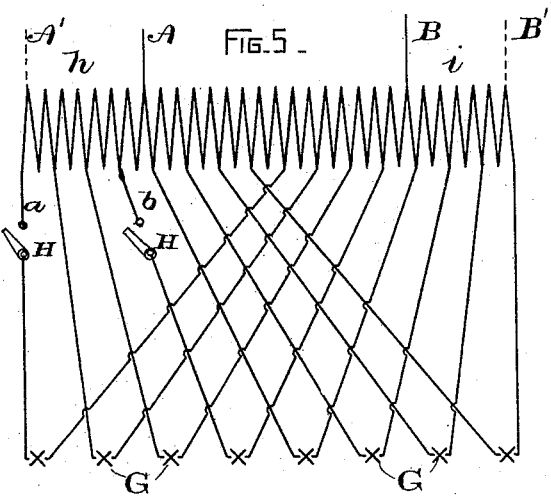
Figure 6:
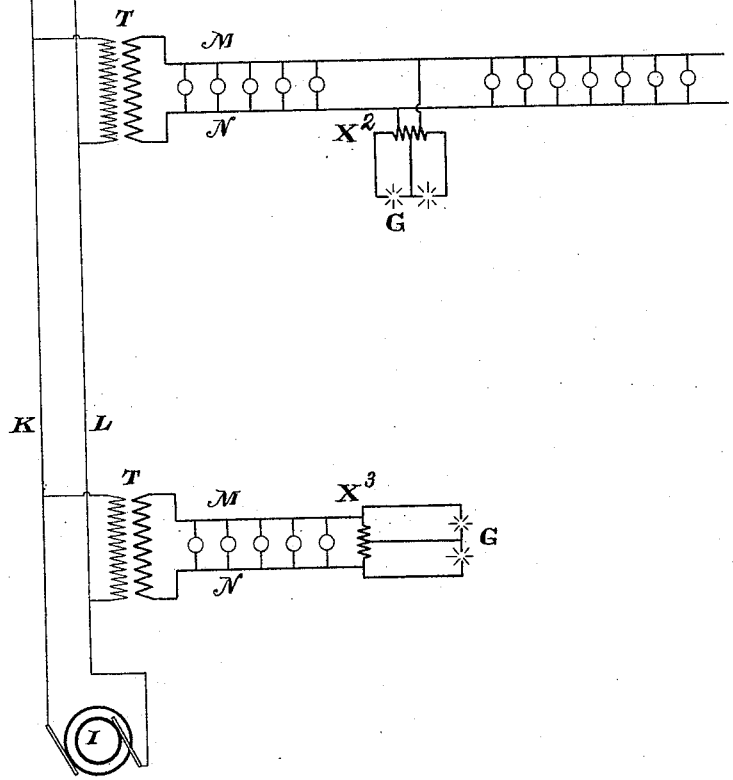

In the accompanying drawings I represent diagrammatically various forms which my invention may assume, Figures 1, 2, 3, 4, and 5 representing particular coil-windings which are adapted for its embodiment, and Fig. 6 illustrating a complete system of distribution.

In all of the figures I have indicated diagrammatically electric lights as the translating devices employed. My invention finds its peculiar usefulness more particularly with arc lamps than with other translating devices, but it is also applicable to such other devices as the installation may require, and I do not mean to exclude any such device from its operation.

Referring now to the figures in order, Fig. 1 illustrates an ordinary form of my invention. A B are the mains of the impressing-circuits. X is the compensating coil referred to, which is provided with the usual core, although this is indicated in part only of the figures.

In the case of Fig. 1 the impressing-circuit is connected to the ends of the coil, and so also are the leads C F' of the impressed circuits, while the other leads of these circuits are connected at E F by the overlapping connection already referred to. At *e f* are shown the mains of the third impressed circuit, and arc lamps G G, &c., are indicated diagrammatically as translating devices.

In the case of Fig. 1 it will be perceived from the statement of invention that the mains A B impress an electromotive force equal to the difference of potential between them. This may be assumed, for illustration, as fifty-two volts, the ordinary potential upon the secondary of the transformer under modern systems of distribution. Assuming that the potential necessary for the arc is thirty volts, the connections E F, *e f*, &c., are taken from points of the coil embracing between them a length just sufficient to obtain this voltage. As stated, some of the circuits overlap the others, and this is the more economical arrangement, as some of the wire of the coil is included in each circuit; but the arrangement may be varied without departing from my invention, although I consider this construction preferable.

Figure 2:
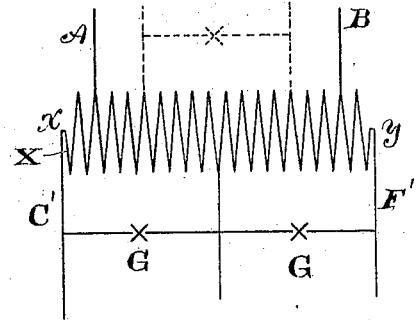

Referring now to Fig. 2, I illustrate substantially the same construction as in Fig. 1, with an additional feature—namely, I extend the ends of the coil *x y* beyond the points of connection of the impressing-circuit. Assuming that the potential between A and B is fifty-two volts, I add so many turns between the lead B and the lead F' of the impressed circuit and between lead A and lead C' of the second impressed circuit as will raise the total potential to sixty volts, or thirty volts for each impressed circuit, in which case the intermediate connections of the impressed circuits need not overlap; but the line may be direct, if desired.

Figure 3:
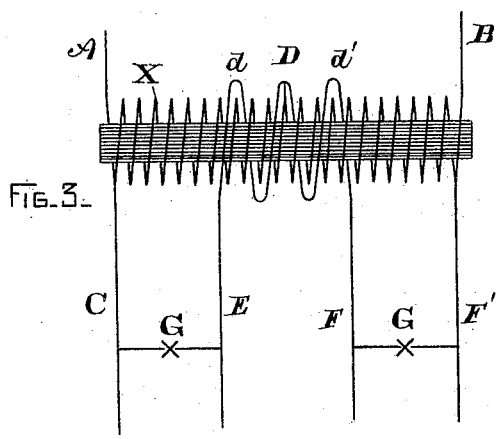

Referring now to Fig. 3, I illustrate another form which my invention may take. In this case I wind about the first coil a second coil in series between the two lamps G G. This coil is connected at its middle point to the middle of the main coil X, embracing a suitable part of the main coil, and serves to raise the voltage delivered to the impressed circuit. If, however, the voltage on the impressing-circuit is too high for the number of lamps in series, the coil may, if desired, act as a counter electromotive force and cut down the potential to the proper amount, although this is not so desirable an arrangement on account of the waste of electric energy involved.

Fig. 4 illustrates a somewhat different arrangement, the outer coil D being in a measure independent of the inner coil X—that is, the impressing-circuit terminals are connected to both coils, while the terminals of the lamps are connected to substantially the same points in the coils. In this case the halves *d d'* of the outer coil are in series with the lamps G G, respectively, and act to adjust the voltage to the proper amount.

In Fig. 5, I show an extension of the arrangements which I have devised to the case of a large number of lamps fed from a single compensator. In this case the span of the connections to each lamp is taken to impress just such an amount of the coil as may be necessary to furnish the potential required, while the connection of the impressing-circuit A B may be taken at intermediate points of the coil, the outer sections *h i* acting to boost the voltage to the proper amount necessary for the number of lamps, or the impressing-circuit itself may give the voltage desired, in which case it would be connected as shown in dotted lines at A' B'. Switches H H are provided, only two being illustrated; but it is to be understood that there is an open-circuiting switch in each lamp, in the leads *a b*, so that one or more of the lamps may be turned off. In this arrangement the sections of the wire are proportioned to the amount of current which they may at any time need to carry, there being a redistribution of the current as the number of lights is varied.

In all of these cases pointed out I depend substantially upon generating, by means of a coil in the impressing-circuit, an electromotive force, and then by using a portion of the same coil I generate a second electromotive force, which may be either counter or assisting in its relation to the first. I then feed the impressed circuit or circuits with the resultant current from these two forces. Where I employ a second independent or partially-independent coil to furnish the second electromotive force, the arrangement somewhat resembles an alternating-current transformer, but it differs therefrom materially in that the circuits are not at any time entirely independent, but are connected at some points.

Referring now to Fig. 6, I show a system of distribution based upon the different forms of my invention, already pointed out. Therein I is a generator of alternating current feeding the mains K L. T T T are ordinary transformers leading to the mains M N from their secondaries. Incandescent lamps *g g* are shown connected between the mains M N, and compensators, such as I have described, are shown at X' X² X³. At X', I show a compensator acting to cut down the voltage. In this case it is assumed that the potential between the mains M N is too great for the two arc lamps G G in series, and therefore I extend the winding of the compensator a little and take the connections for the impressed circuits at a point between the end and the center, thus using a portion of the coil to obtain a counter electromotive force and bringing down the voltage to that which is proper for the two lamps. At $X^3$, I show an ordinary compensator adapted for the two lamps in series, where the winding and connection are such as to divide the voltage precisely, while at $X^2$, I show what might be called a "booster-compensator," where the connections of the impressing-circuit from the mains M N are taken at points nearer the center of the coil than the connections of the impressed circuits, the windings on the ends of the coil thus acting as boosters to raise the potential, where it would be otherwise too low to run the lamps G in series.

I have described in the present application a compensator having overlapping connections or coils, and from this I derive great advantages. This arrangement secures a greater capacity from the same size of compensator, and therefore greater economy, at the same time preserving the compensation equally well. It also equalizes the load upon the different parts of the compensator-winding. It enables circuits of the same or different voltage to be run from the same compensator. In fact, a considerable number of lamps may be served by a very small compensator, which gives a much greater efficiency in distribution and a decreased cost, and necessarily a less loss when the compensator is run with a light load or with no load. I have found that the currents in this overlapping arrangement tend to differentiate with each other, and this produces a resultant in the coils of the compensator which is much smaller than that which would flow with the circuits not arranged to overlap.

What I claim as new, and desire to secure by Letters Patent of the United States, is—

1. A compensator for an alternating current distribution system, adapted to subdivide the potential of the delivered current, consisting of a coil, an impressing circuit connected thereto, and impressed circuits fed therefrom, the connections from the impressed circuits overlapping each other, as herein described.

2. The method of regulating the potential of an alternating current, which consists in connecting the impressed circuit or circuits to points in a coil embracing between them a fraction of its length, and attaching the impressing circuit connections to the coil at various relative distances from the impressed circuit connections and from the ends of the coil, to determine the potential of the current delivered to the impressed circuits, as set out herein.

3. In a system of distribution of electric energy, a generator, lines leading therefrom, translating devices fed in parallel from such lines, and a compensating coil included between the lines having sets of connections therefrom to other translating devices, such connections in each set embracing parts of the coil less than its entire length, and the relative distances of the connections of the impressing circuit and the impressed circuits from the ends of the coil being fixed so as to determine the potential upon the impressed circuits suitable for the translating devices employed, substantially as herein set out.

4. In a compensator for an alternating current circuit, a coil connected between the leads of the impressing circuit, and two or more coils also connected in such impressing circuit and in the impressed circuit or circuits and acting to vary the effect of the first coil and thus determine the potential of the current delivered to the impressed circuit or circuits.

5. As a new article of manufacture, a compensator for alternating current circuits, consisting of a coil, connections for the impressing circuit attached to such a coil, and connections for impressed circuits also connected to the coil in overlapping positions, as herein described and for the purpose set forth.

6. The method of regulating the potential of an alternating current herein set out, which consists in connecting an impressing circuit to a coil at various distances from its ends, and connecting an impressed circuit to the coil at various distances from the impressing circuit connections.

In witness whereof I have hereunto set my hand this 26th day of June, A. D. 1894.

ELIHU THOMSON.

Witnesses:
JOHN W. GIBBONEY,
HENRY O. WESTENDARP.